United States Patent
Ogisu et al.

(10) Patent No.: US 7,470,888 B2
(45) Date of Patent: Dec. 30, 2008

(54) DAMAGE DETECTION SYSTEM

(75) Inventors: Toshimichi Ogisu, Tokyo (JP); Seiji Kojima, Hitachi (JP); Nobuo Takeda, Tokyo (JP)

(73) Assignees: Fuji Jukogyo Kabushiki Kaisha, Tokyo (JP); Hitachi Cable, Ltd., Tokyo (JP); The University Of Tokyo, Tokyo (JP)

( * ) Notice: Subject to any disclaimer, the term of this patent is extended or adjusted under 35 U.S.C. 154(b) by 6 days.

(21) Appl. No.: 11/708,842

(22) Filed: Feb. 21, 2007

(65) Prior Publication Data
US 2007/0200057 A1    Aug. 30, 2007

(30) Foreign Application Priority Data
Feb. 27, 2006    (JP)    ............................ 2006-050481

(51) Int. Cl.
*G01J 1/04* (2006.01)
*G01J 1/42* (2006.01)
*G01J 5/08* (2006.01)

(52) U.S. Cl. .............................. 250/227.14; 250/227.16

(58) Field of Classification Search ............ 250/227.14, 250/227.15, 237 R, 237 G, 227.16
See application file for complete search history.

(56) References Cited

U.S. PATENT DOCUMENTS

| 5,898,502 | A | * | 4/1999 | Horiuchi et al. ............. 356/416 |
| 6,525,308 | B1 | * | 2/2003 | Schmidt-Hattenberger ....... 250/227.23 |
| 2005/0067559 | A1 | * | 3/2005 | Ogisu et al. ............ 250/227.14 |

FOREIGN PATENT DOCUMENTS

JP    2005-098921    4/2005

* cited by examiner

*Primary Examiner*—Seung C Sohn
(74) *Attorney, Agent, or Firm*—Smith, Gambrell & Russell

(57) ABSTRACT

A damage detection system including: a optical fiber sensor including a core portion to have a grating portion formed therein, the grating portion having gratings reflecting light, wherein a wavelength band of the reflected light changes when a distance between adjacent gratings changes; a light source to input broadband light into the core portion; two optical filters connected to an output end of the sensor; and an apparatus to perform arithmetic processing on output values of the optical filters, wherein each passband of the optical filters overlaps with the vibration range of the wavelength band, in which a center wavelength of one of the passbands is fixed to an upper area of a vibration center of a center wavelength of the reflected light and that of the other of the passbands is fixed to a lower area thereof.

12 Claims, 13 Drawing Sheets

SPECTRUM ANALYZER — 42

INPUT WAVE

FIG.4C

OUTPUT WAVE

FIG.9A  θ = 0° (AXIS DIRECTION)

FIG.9B  θ = 45°

FIG.9C  θ = 90° (TRANSVERSE DIRECTION)

DAMAGE DETECTION SYSTEM

CROSS-REFERENCE TO RELATED APPLICATION

The present U.S. patent application claims a priority under the Paris Convention of Japanese patent application No. 2006-50481 filed on Feb. 27, 2006, and shall be a basis of correction of an incorrect translation.

BACKGROUND OF THE INVENTION

1. Field of the Invention

The present invention relates to a damage detection system using optical fiber sensors.

2. Description of Related Art

In a field which requires both strength and reduced weight for materials such as airframes of aircrafts or the like, it is essential that composite materials, e.g., carbon fiber reinforced plastics (CFRP), are widely applied in order to meet such requirements.

Damage detection apparatuses using FBG (Fiber Bragg grating)-type optical fiber sensors are disclosed in Patent Document 1 (Japanese Unexamined Patent Publication No. 2005-98921) and Patent Document 2 (U.S. Pat. No. 5,493,390, FIGS. 5A-5C), as apparatuses for detecting damages and defects occurred in such composite materials. The diameter of an optical fiber is becoming finer and finer (for example, diameter of 55 μm) in recent years. As a result, even when the optical fiber is embedded in a structure, the strength of the structure is not reduced so much. Therefore, an optical fiber has an advantage of a high degree of flexibility for its installation.

According to the technique described in Patent Document 1, the apparatus includes a piezoelectric element fixedly disposed on a predetermined position of a structural composite material, lead wires for transmitting a signal to the piezoelectric element, a optical fiber sensor fixedly disposed with a composite material for the structural composite material sandwiched between the optical fiber sensor and the piezoelectric element, and having a grating portion in a core thereof for reflecting light having a predetermined wavelength, a light source for irradiating light onto the core portion, and a characteristic detection unit to detect the characteristic of the light reflected from the grating portion. The piezoelectric element applies vibration to the material, and thereby damage is detected based on a change of the output from the characteristic detection unit. As for the characteristic detection unit, a spectrum analyzer is used for detecting frequency characteristics of the reflected light from the grating portion.

In the technique described in Patent Document 1, damage is determined depending on comparison with the detected data previously obtained from the healthy structural composite material. Alternatively, by setting a threshold value for a shift value of a specific frequency in a frequency distribution detected by the spectrum analyzer, the shift value being a value shifted from that obtained when no vibration is applied, it may be determined that damage exists when the shift value is not larger than the threshold value (paragraph 0032).

In the technique described in Patent Document 1, there is a need for a structure of a spectrum analyzer that can respond to a damage detection system with high accuracy.

On the other hand, the technique described in Patent Document 2 employs an opto-acoustical tuned filter as a spectrum analyzer.

In the technique described in Patent Document 2, a center wavelength of the reflected light, reflected out by the FBG optical fiber sensor, is fixed at center of the slope of the filter characteristic curve (FIGS. 5A and 5B), and an output value of the filter increases and decreases according to the vibration of the center wavelength of the reflected light when vibration is applied, which is represented by an output wave changing relative to the elapse of time (FIG. 5C) and obtained as basic data for detecting damage. In order to catch the change of the center wavelength of the reflected light, there is a need for such an FBG optical fiber sensor that has a sharp output characteristic of reflected light with a half-width (width at a half of the peak value) as small as possible.

On the other hand, it is required for highly accurate detection that a elastic wave of higher frequency has to be applied to a subject to be inspected, and the sensor length of the FBG optical fiber sensor is required to be short in order to detect the elastic wave of higher frequency with high sensitivity. However, the shorter sensor length causes the wave to be broader to make the half-width of the sensor output wider. The wider half-width of the sensor output causes the change of detection value to be smaller in the technique described in Patent Document 2. This causes a difficulty in capturing the wavelength change of the reflected light, so that a highly accurate damage detection system cannot be constructed.

SUMMARY OF THE INVENTION

The present invention has been developed in view of the above-described problems of the prior art, and an object of the invention is to detect damages with high accuracy in a damage detection system using optical fiber sensors.

In order to solve the problem, in accordance with a first aspect of the invention, the damage detection system includes: a vibration actuator to apply vibration to a subject to be inspected; a optical fiber sensor including a core portion to have a grating portion formed therein, the grating portion having a plurality of gratings reflecting light, wherein a wavelength band of the reflected light changes when a distance between adjacent gratings changes, and the optical fiber sensor vibrates the wavelength band depending on an elastic wave transmitted from the subject; a light source to input broadband light which includes at least a vibration range of the wavelength band, into the core portion; two optical filters connected to an output end of the optical fiber sensor; and an arithmetic processing apparatus to perform arithmetic processing on output values of the two optical filters, the values being obtained when the vibration actuator applies vibration, wherein each of passbands of the two optical filters overlaps with the vibration range of the wavelength band, in which a center wavelength of one of the passbands is fixed to an upper area with respect to a vibration center of a center wavelength of the reflected light and a center wavelength of the other of the passbands is fixed to a lower area with respect to the vibration center of the center wavelength of the reflected light.

Preferably, the optical filters are arrayed waveguide grating (AWG) type optical filters.

The grating portion of the optical fiber sensor has, preferably, a length not more than one-thirds of a wavelength of the elastic wave transmitted from the subject.

The arithmetic processing apparatus may analyze a change of output values for a predetermined period output from the two optical filters and calculates a value corresponding to a scale of damage in the subject.

In accordance with a second aspect of the invention, the damage detection system includes: a optical fiber sensor including a core portion to have a grating portion formed therein, the grating portion having a plurality of gratings reflecting light, wherein a wavelength band of the reflected light changes when a distance between adjacent gratings changes; a light source to input broadband light which includes the wavelength band, into the core portion; two optical filters connected to an output end of the optical fiber sensor; and an arithmetic processing apparatus to perform arithmetic processing on output values of the two optical filters, wherein each of passbands of the two optical filters overlaps with the vibration range of the wavelength band, in which a center wavelength of one of the passbands is fixed to an upper area with respect to a vibration center of a center wavelength of the reflected light and a center wavelength of the other of the passbands is fixed to a lower area with respect to the vibration center of the center wavelength of the reflected light.

According to the invention, since each passband related to the two optical filters overlaps with the vibration range of the wavelength of the reflected light, output values of the two optical filters fluctuate corresponding to the wavelength vibration of the reflected light. Further, since the respective center-wavelengths of passbands of the two optical filters are fixedly arranged to the upper area and lower area relative to the vibration center of the center wavelength of the reflected light, the output values of the two optical filters increase and decrease opposite to each other. The relative change due to the two output values, which increase and decrease opposite to each other, is larger than the change of one output value, therefore the relative value due to the two output values, which increase and decrease opposite to each other, can be obtained as a larger detection value. Resultantly, the wavelength vibration of reflected light can be captured with high sensitivity, which allows highly accurate damage detection.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein.

DETAILED DESCRIPTION OF THE PREFERRED EMBODIMENT

Hereinafter, an embodiment of the present invention will be described with reference to the attached drawings. The embodiment exemplifies the invention and does not limit the invention.

Figure 1:
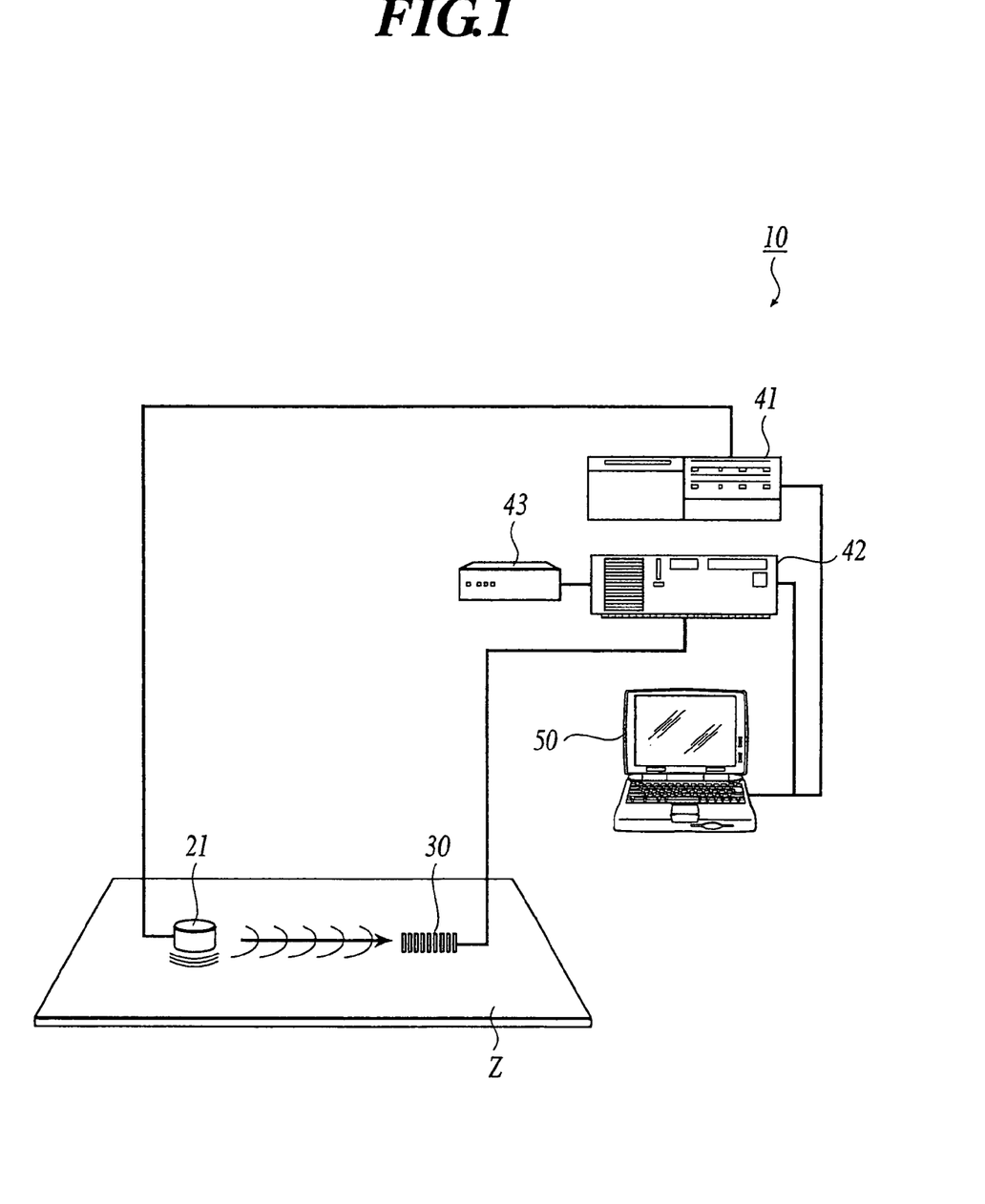
FIG. 1 is a schematic configuration view of a damage detection system according to an embodiment of the present invention.

FIG. 1 is a schematic configuration view of a damage detection system 10 which detects damage in a structural composite material Z. In the embodiment, a structural composite material is used as a subject to be inspected.

As shown in FIG. 1, the damage detection system 10 of the embodiment includes a piezoelectric element 21 adhered to the surface of the structural composite material Z in the vicinity of a point where damage detection in the structural composite material Z is to be performed, a optical fiber sensor 30 installed in the vicinity of the point where damage detection in the structural composite material Z is to be performed, a controller 41 which controls the piezoelectric element 21, a spectrum analyzer 42 which detects wavelength characteristics of reflected light obtained from the optical fiber sensor 30, and an arithmetic processing apparatus 50 which executes arithmetic processing on output values from the spectrum analyzer 42. A power supply 43 for the spectrum analyzer 42 is also shown in the figure.

A piezoelectric element is used as an oscillation actuator of a vibration actuator in the embodiment, however, the oscillation actuator is not limited thereto, and other element may be used as long as it can generate a certain elastic wave. Moreover, an elastic wave generated by the impact from the outside and the like may be used. A plurality of piezoelectric elements may be used as needed.

The piezoelectric element 21 changes its thickness in a thickness direction when a drive voltage is applied from the outside. By utilizing this characteristic, the controller 41 applies a drive pulse voltage to any piezoelectric element 21, to thereby apply momentary vibration to the structural composite material Z.

The optical fiber sensor 30 is an FBG (Fiber Bragg Grating) type optical fiber sensor. As shown in a schematic configuration view of FIG. 2A, the sensor 30 includes an optical fiber 34 having a grating portion 33 in a core portion 32, which reflects light having a predetermined wavelength.

Figures 2A, 2B:
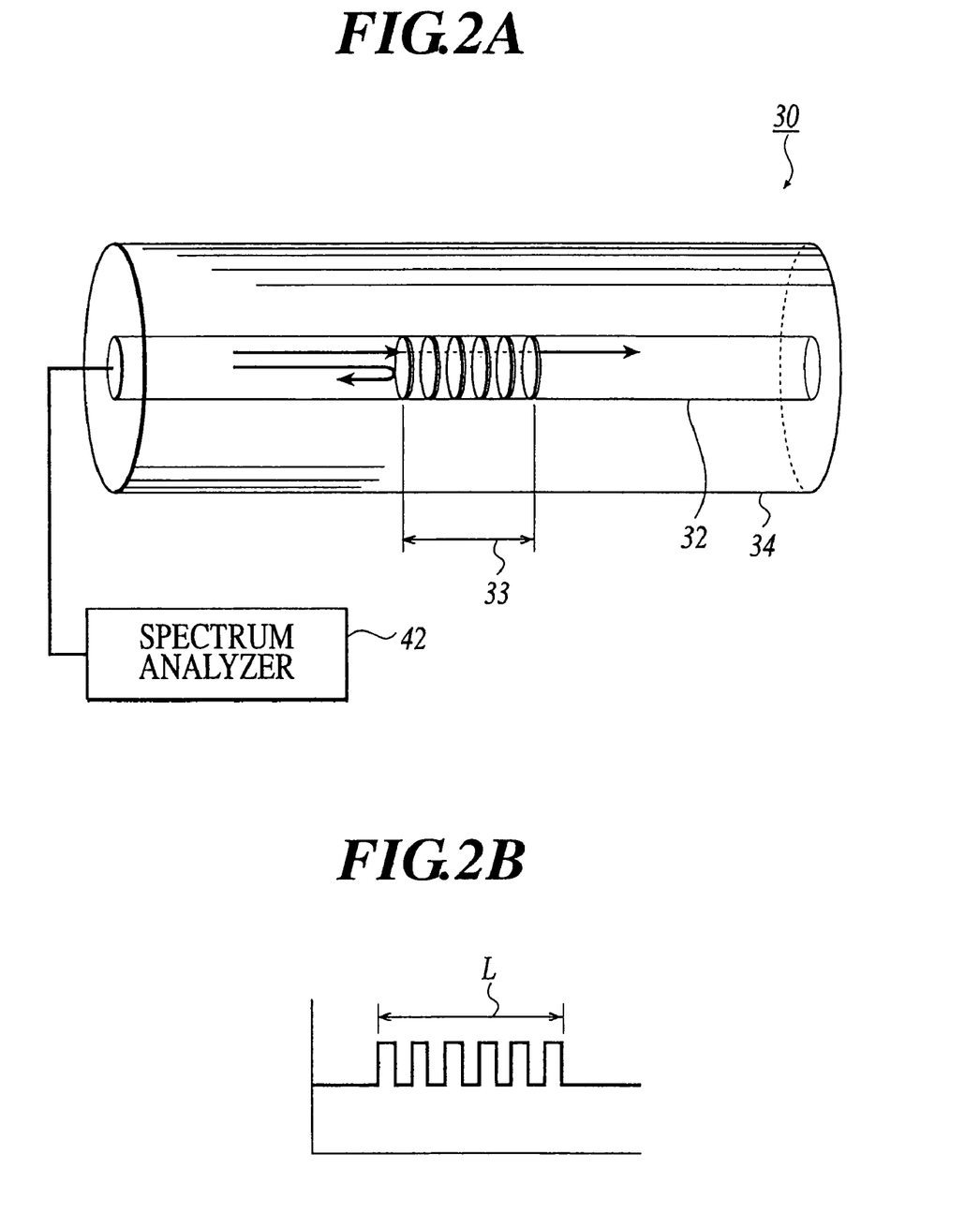
FIG. 2A is a schematic configuration view of a optical fiber sensor.
FIG. 2B is a diagram showing a refractive index change of a grating portion in a light traveling direction.

The optical fiber 34 is connected to the spectrum analyzer 42 at one end thereof. Irradiation light which covers a wavelength band of a predetermined range, enters the core portion 32 from a light source included in the spectrum analyzer 42. The light which has entered from the spectrum analyzer 42 propagates through the core portion 32, and light with a certain wavelength is reflected from the grating portion 33.

FIG. 2B is a diagram showing a refractive index change of the core portion 32 in the light traveling direction. The refractive index of the grating portion 33 is shown in a region L in the figure.

As shown in the figure, the grating portion 33 is formed such that the refractive index of the core portion 32 is periodically changed. The grating portion 33 is formed so as to selectively reflect light with a particular wavelength at the boundary where the refractive index changes. When disturbance, such as strain caused by application of vibration, is applied to the grating portion 33, the wavelength of reflected light is shifted according to the change of a grating space (expansion and contraction).

When an effective refractive index is given by n, grating space by Λ, Pockels coefficients by $P_{11}$ and $P_{12}$, Poisson's ratio by ν, applied strain by ε, temperature coefficient of fiber material by α, temperature change by ΔT, then the wavelength shift $\Delta\lambda_B$ of the reflected light from the FBG optical fiber sensor is given by the following expression (Alan D. Kersey, "Fiber Grating Sensors" JOURNAL OF LIGHTWAVE TECHNOLOGY, Vol. 15, No. 8, 1997):

[Expression 1]

$$\Delta\lambda_B = 2n\Lambda\left(\left\{1-\left(\frac{n^2}{2}\right)[P_{12}-\nu(P_{11}+P_{12})]\right\}\varepsilon + \left[\alpha + \frac{\left(\frac{dn}{dT}\right)}{n}\right]\Delta T\right)$$

Accordingly, when vibration is applied to the grating portion 33, the strain amount ε of the grating portion 33 changes, and as a result, the wavelength of reflected light is shifted in accordance with the strain amount ε. When vibration from a vibration source is transmitted well, the grating portion 33 is largely deformed, and the wavelength shift amount $\Delta\lambda_B$ becomes large. When vibration from the vibration source is not transmitted well, the grating portion 33 gets strained a little, and the wavelength shift amount $\Delta\lambda_B$ becomes small.

Figure 3A:
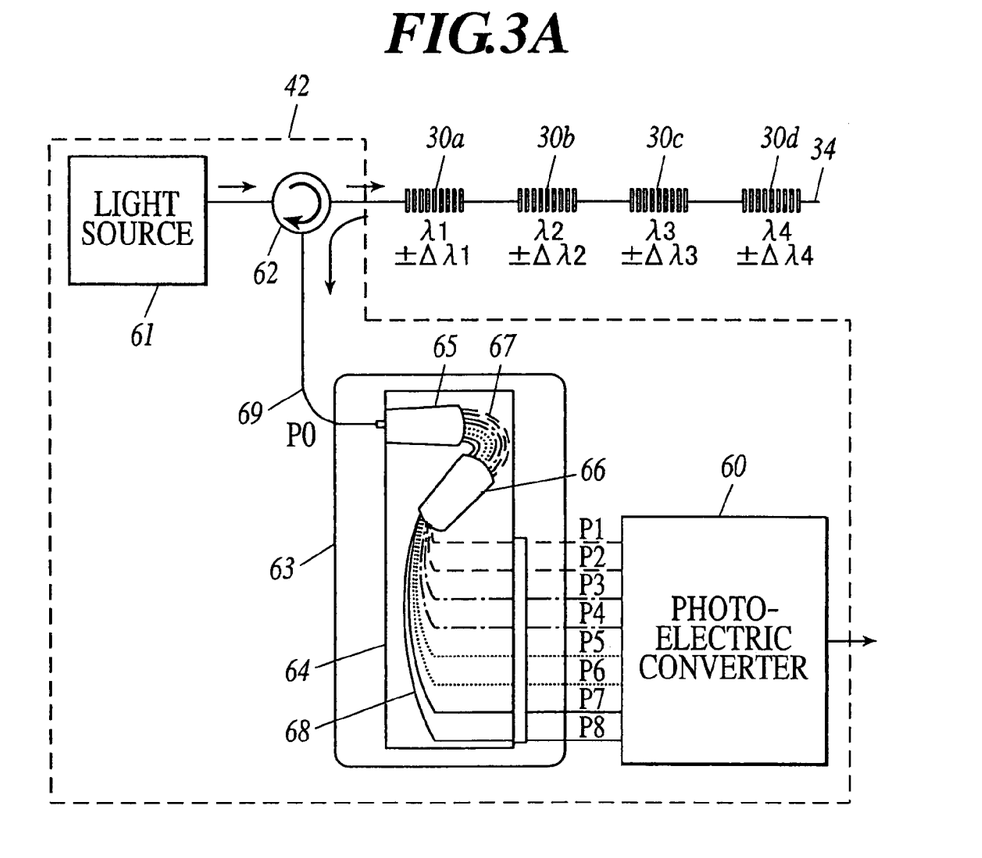
FIG. 3A is a configuration view of a optical fiber sensor and a spectrum analyzer connected thereto.

FIG. 3A shows a optical fiber sensor and an exemplary structure of the spectrum analyzer 42 connected thereto. As shown in FIG. 3A, the spectrum analyzer 42 includes a light source 61, an optical circulator 62, an AWG module 63, and a photo-electric converter 60. In the exemplary structure, the optical fiber 34 has four optical fiber sensors 30a-30d which have different reflection wavelengths from each other and are arranged in series, and is connected to the spectrum analyzer 42. The optical fiber 34 may have one optical fiber sensor 30 as a minimum structure.

The light source 61 has a broadband spectrum which covers the entirety of vibration ranges of the reflection wavelengths from the optical fiber sensors 30a-30d, so that complete reflected light can be always obtained even when the reflection wavelengths from the optical fiber sensors 30a-30d vibrate due to an elastic wave.

The optical circulator 62 causes the light from the light source 61 to travel toward the optical fiber sensors 30a-30d, and guides out the light reflected from the sensors 30a-30d to an input port P0 of the AWG module 63. The reflected light guided out by the optical circulator 62 is guided in the input port P0 with an optical fiber 69.

The AWG module 63 has an AWG substrate 64. The AWG substrate 64 has a light-wave circuit formed thereon which is monolithically integrated on a glass substrate with application of light waveguide technology. The light-wave circuit on the AWG substrate 64 includes input/output slab waveguides 65 and 66, respectively, arrayed waveguides 67, and output waveguides 68, which form eight optical filters connected to the input port P0 in parallel and having different passbands from each other. The light-wave circuit on the AWG substrate 64 enables the wavelength-multiplexed input light to be distributed to the eight optical filters, and to be passed and separated into respective wavelengths to be output in parallel to eight output ports P1-P8. Here, the number of output ports is not limited to eight in practical use.

Figure 3B:
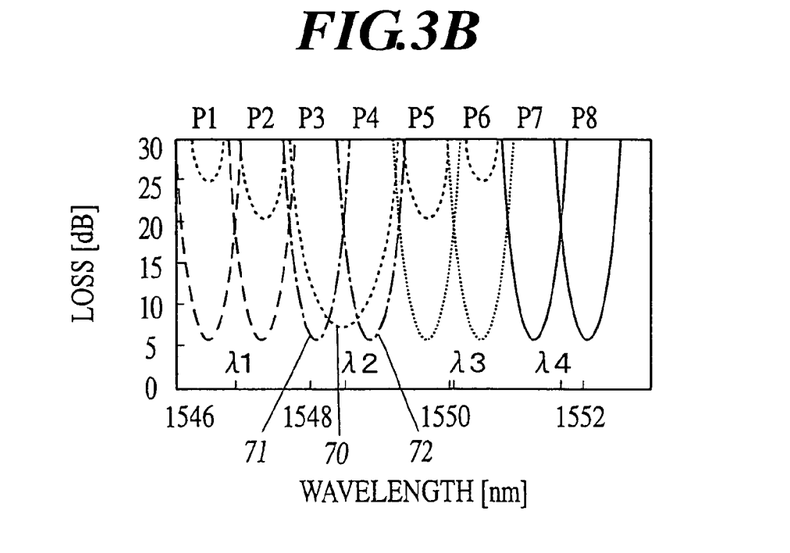
FIG. 3B is a spectrum diagram showing passbands of eight optical filters.

Respective passbands of the optical filters corresponding to the eight output ports P1-P8 are shown in a spectrum diagram of FIG. 3B. In FIG. 3B, for example, input distribution 70 of the reflected light from the optical fiber sensor 30b having a center wavelength λ2 overlaps with a passband 71 of one optical filter. The reflected light corresponding to the overlapping portion passes the optical filter to be output to the output port P3. In parallel with this, the reflected light corresponding to a portion overlapping with a passband 72 passes another optical filter to be output to the output port P4. Similarly, the output ports P1 and P2 correspond to the optical fiber sensor 30a having a reflected-light center wavelength λ1, the output port P5 and p6 to the optic sensor 30c having a center wavelength λ3, and the output port P7 and P8 to the optic sensor 30d having a center wavelength λ4, thus wavelengths can be separated on the same principle. As described above, the optical fiber 34 may have one optical fiber sensor 30 as a smallest component, and two optical filters may be employed in this case.

As a typical example, processing of reflected light from one optical fiber sensor 30 will be explained with reference to FIGS. 4A-4C.

Figure 4A:
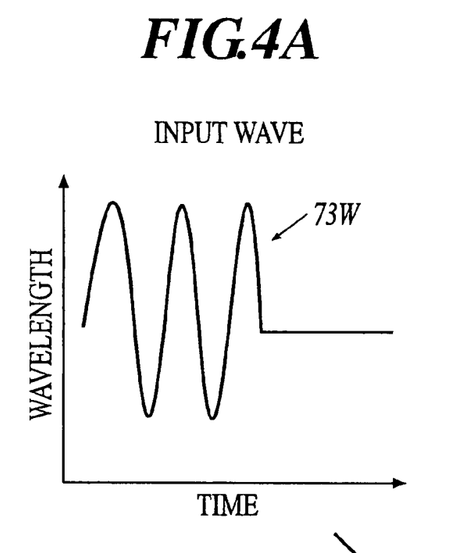
FIG. 4A shows a waveform of an input wave to the optical filter.
Figure 4B:
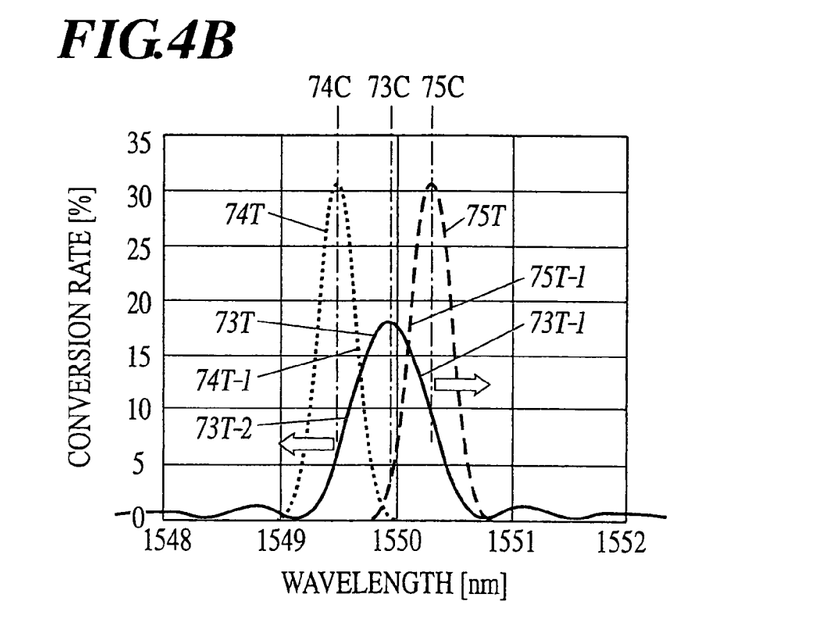
FIG. 4B is a spectrum diagram showing passbands of two optical filters.

Input distribution 73T of the reflected light from the optical fiber sensor 30 is presented as shown in FIG. 4B. When a vibration is applied by the piezoelectric element 21, an elastic wave generated by the piezoelectric element 21 propagates through the structural composite material Z, and the wavelength of reflected light output from the sensor 30 is vibrated according to the elastic wave transmitted from the composite material Z. This wavelength vibration is shown as an input wave 73W in FIG. 4A.

According to this wavelength vibration, the input distribution 73T of the reflected light shown in FIG. 4B alternately shifts to an upper side and a lower side to vibrate a little, so that the wavelength value repeatedly increases and decreases.

In such a wavelength vibration, 73C in the figure indicates a vibration center of the center wavelength in the input distribution 73T of the reflected light. A center wavelength 75C of a passband 75T of one-side optical filter is fixed to the upper (longer wavelength) area relative to the vibration center 73C. A center wavelength 74C of a passband 74T of the other-side optical filter is fixed to the lower (shorter wavelength) area relative to the vibration center 73C.

Respective center wavelengths 75C and 74C are fixedly positioned apart from the vibration center 73C not less than the amplitude of wavelength vibration of the reflected light.

Further, in a static state of the input distribution 73T of the reflected light, the lower side slope 75T-1 of the upper side passband 75T crosses the upper side slope 73T-1 of the input distribution 73T of the reflected light, and the upper side passband 75T overlaps with the input distribution 73T of the reflected light by a width not less than the amplitude of the wavelength vibration.

Similarly, in a static state of the input distribution 73T of the reflected light, the upper side slope 74T-1 of the lower side passband 74T crosses the lower side slope 73T-2 of the input distribution 73T of the reflected light, and the lower side passband 74T overlaps with the input distribution 73T of the reflected light by a width not less than the amplitude of the wavelength vibration.

By fixing the passbands 75T and 74T to the above-described positional correlation with respect to the input distribution 73T of the reflected light, wavelength vibration of the reflected light can be detected with high sensitivity.

An upper-side optical filter (having a longer-wavelength passband) transmits and outputs the reflected light corresponding to the overlapping portion of the input distribution 73T of the reflected light with the passband 75T. Similarly, a lower-side optical filter (having a shorter-wavelength passband) transmits and outputs the reflected light corresponding to the overlapping portion of the input distribution 73T of the reflected light with the passband 74T.

Accordingly, when the input distribution 73T of the reflected light shifts to the upper side due to the increase of the wavelength value of the reflected light, the output value of the upper-side optical filter having the passband 75T increases, and the output value of the lower-side optical filter having the passband 74T decreases. On the contrary, when the input distribution 73T of the reflected light shifts to the lower side due to the decrease of the wavelength value of the reflected light, the output value of the upper-side optical filter having the passband 75T decreases, and the output value of the lower-side optical filter having the passband 74T increases.

Figure 4C:
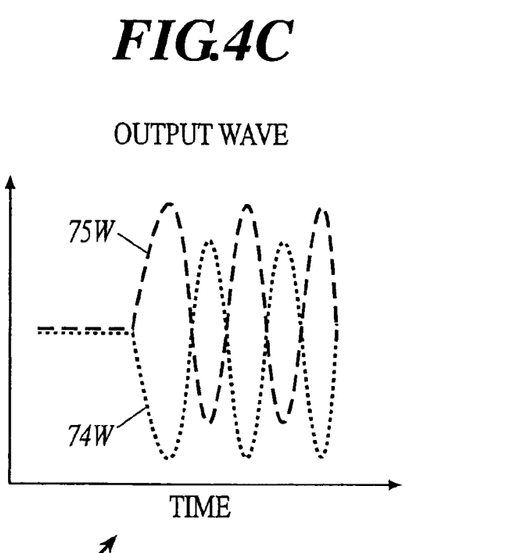
FIG. 4C shows waveforms of output waves from the optical filters.

As a result, when the center wavelength of the reflected light vibrates with the input wave 73W shown in FIG. 4A, the output value of the upper-side optical filter having the passband 75T generates an output wave 75W shown in FIG. 4C, and the output value of the lower-side optical filter having the passband 74T generates an output wave 74W shown in FIG. 4C. As shown in FIG. 4C, the output waves 74W and 75W are in opposite phase to each other.

Based on the principle described above, the spectrum analyzer 42 shown in FIG. 3 outputs respective light waves to the eight output ports P1-P8 when a vibration is applied. The photo-electric converter 60 converts these waves to electric signals to be output outside. The output of the spectrum analyzer 42 is subjected to A/D conversion through an interface (not shown) and input to the arithmetic processing apparatus 50.

Figure 5:
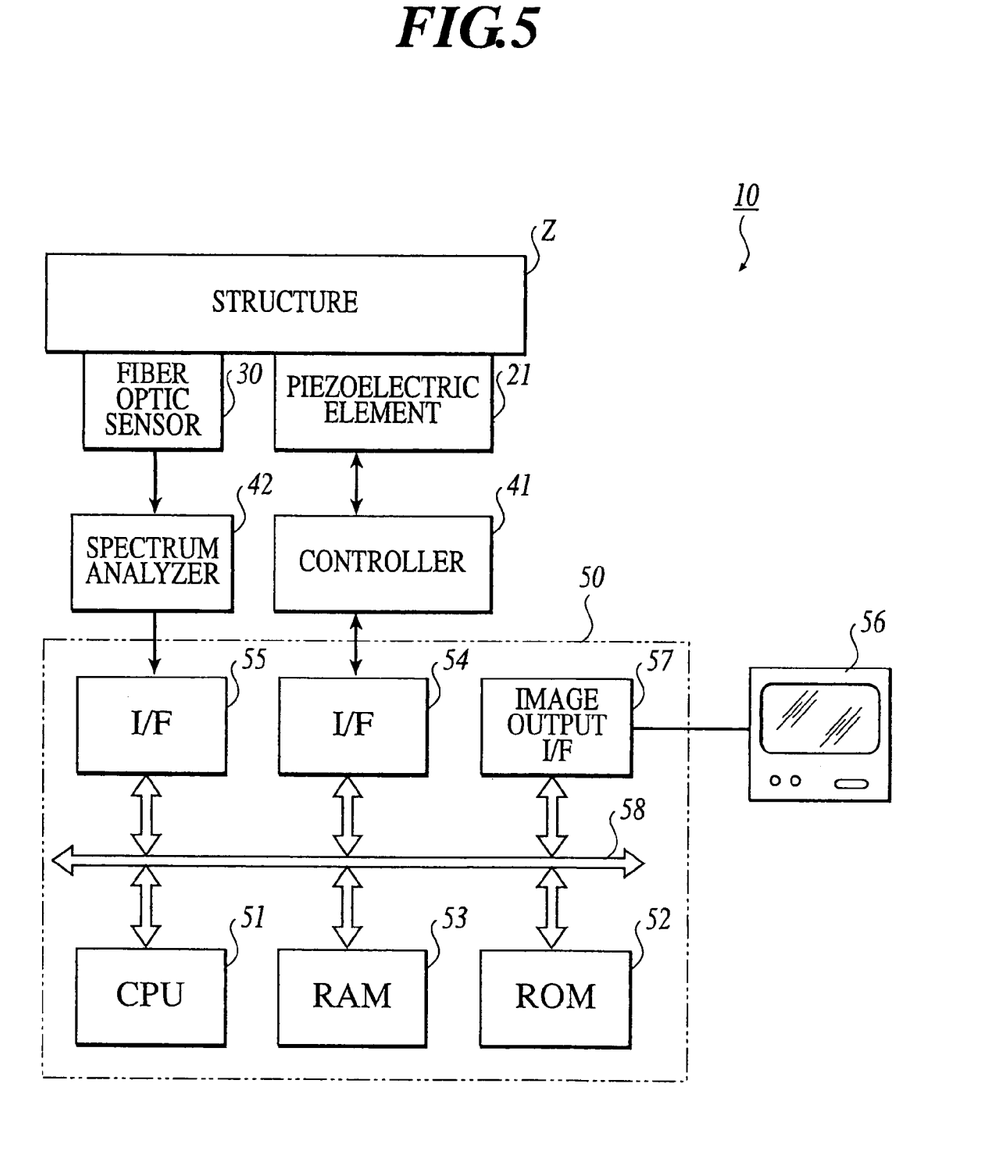
FIG. 5 is a block diagram showing a control system of the damage detection system according to an embodiment of the invention.

As shown in FIG. 5, the arithmetic processing apparatus 50 includes a CPU 51 that performs arithmetic processing in accordance with programs, a ROM 52 that stores the programs for various kinds of processing and controls, a RAM 53 that serves as a work area where data and the like are temporarily stored during the various kinds of processing, an interface 54 that sends and receives data to and from the controller 41, an interface 55 that receives data from the spectrum analyzer 42, an image output interface 57 which converts display data of the arithmetic processing result into an image signal that is appropriately formatted for a display monitor 56 to output the image signal to the display monitor 56, and a data bus 58 through which various instructions and data are transmitted among these units.

The damage detection system 10 applies vibration to the structural composite material Z by the piezoelectric element 21 installed on the structural composite material Z, and detects whether damage exists or not in the vicinity of the optical fiber sensor 30 based on the propagation state of the elastic wave detected by the optical fiber sensor 30. The arithmetic processing apparatus 50 executes various functions by the CPU 51 that processes the various programs stored in the ROM 52 using the RAM 53. Various functions executed by the arithmetic processing apparatus 50 will be described below.

In accordance with the programs stored in the ROM 52, the CPU 51 performs operation control of the controller 41 so as to apply a driving pulse voltage to the piezoelectric element 21. When a plurality of piezoelectric elements 21 are used, any of the piezoelectric elements 21 may be selected. However, it is preferable to select as a vibration-generating source, for example, a piezoelectric element placed such that there exists a location in the composite material Z where damage is easy to occur between the piezoelectric element and the grating portion 33 of the optical fiber sensor 30.

The CPU 51 executes processing of applying a driving pulse voltage to the piezoelectric element 21 according to the program stored in the ROM 52, obtaining eight output-wave data output in parallel from the spectrum analyzer 42 for a certain period while the piezoelectric element 21 applies vibration, and storing the data in the RAM 53.

The CPU 51 analyzes the output waves using wavelet transform. That is, CPU 51 calculates a DI (Damage Index) value defined by Equation (1) for a pair of output-wave data opposing to each other. Meanwhile, two output-wave data from the output ports P1 and P2 as output sources, from the output ports P3 and P4, from the output ports P5 and P6, and from the output ports P7 and P8, these two output-wave data respectively correspond to the pair of output-wave data opposing to each other.

[Expression 2]

$$DI = \sqrt{\frac{1}{N_d} \sum_{ij}(x_{ij} - \overline{x_{ij}})^2}$$ Equation (1)

Figure 6:
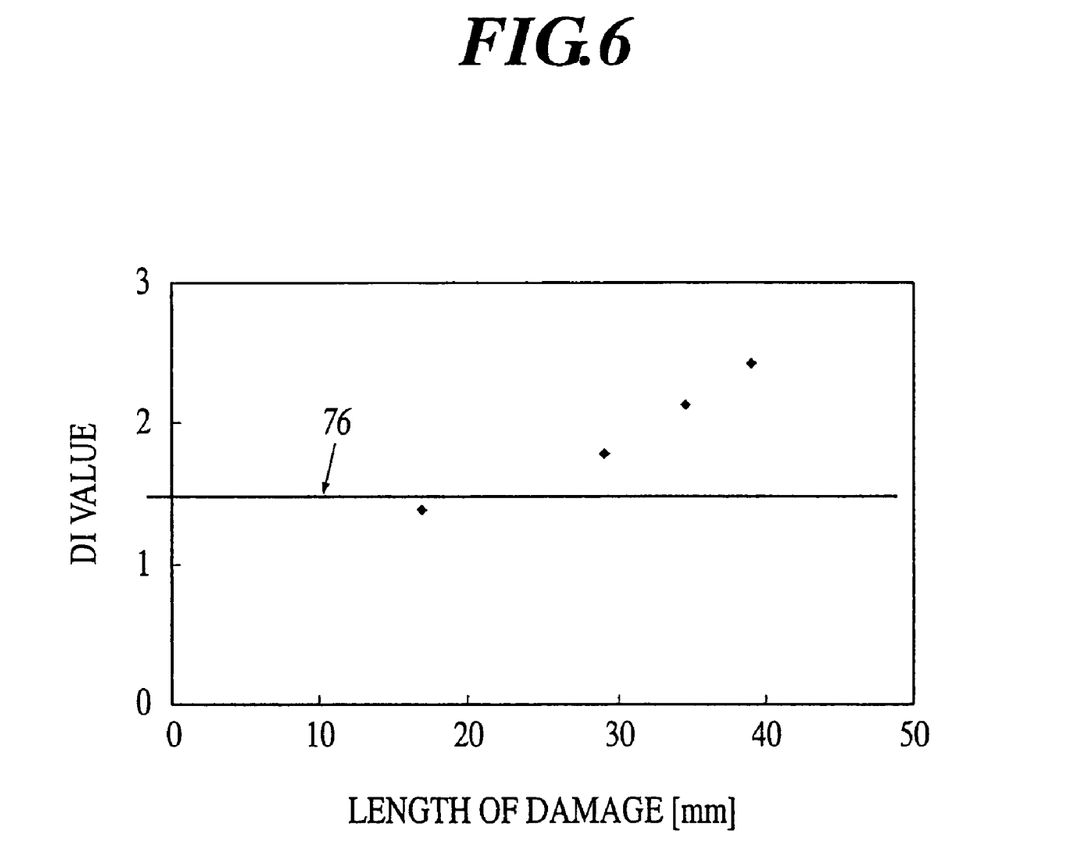
FIG. 6 is a graph showing the relationship between length of damage and DI values.

The DI value is a value corresponding to a damage size of a subject to be inspected. In other words, the DI value increases according as the damage size of the subject becomes larger, therefore the size of the damage can be evaluated by the DI value. FIG. 6 is a graph in which DI values are plotted with respect to the length of damage based on the measurement result of DI values for known damages. As shown in FIG. 6, the DI value shows a larger value according as the damage becomes longer.

The CPU 51 outputs and displays the DI value and information based on the DI value on the display monitor 56, which gives a system operator effective information to inform of the existence, scale, position and the like of the damage.

For instance, the system sets a threshold value 76 in advance as shown in FIG. 6 by storing the value in the RAM 53 or the like, executes a determining process by the CPU 51 whether a calculated DI value is larger than the threshold value 76, and outputs occurrence of damage on the display monitor 56 when the DI value exceeds the threshold value 76.

As for a format to display the result of detection/ arithmetic processing, it is effective to display the DI value numerically in a simplest manner, and alternatively it is preferable to display the existence of damage due to the above-described threshold processing, and further to conveniently display not only the existence of damage but also the damage scale and damage-occurrence position and the like.

(Arrangement of Optical Fiber Sensor and Piezoelectric Element (Vibration Applying Source))

Figure 7:
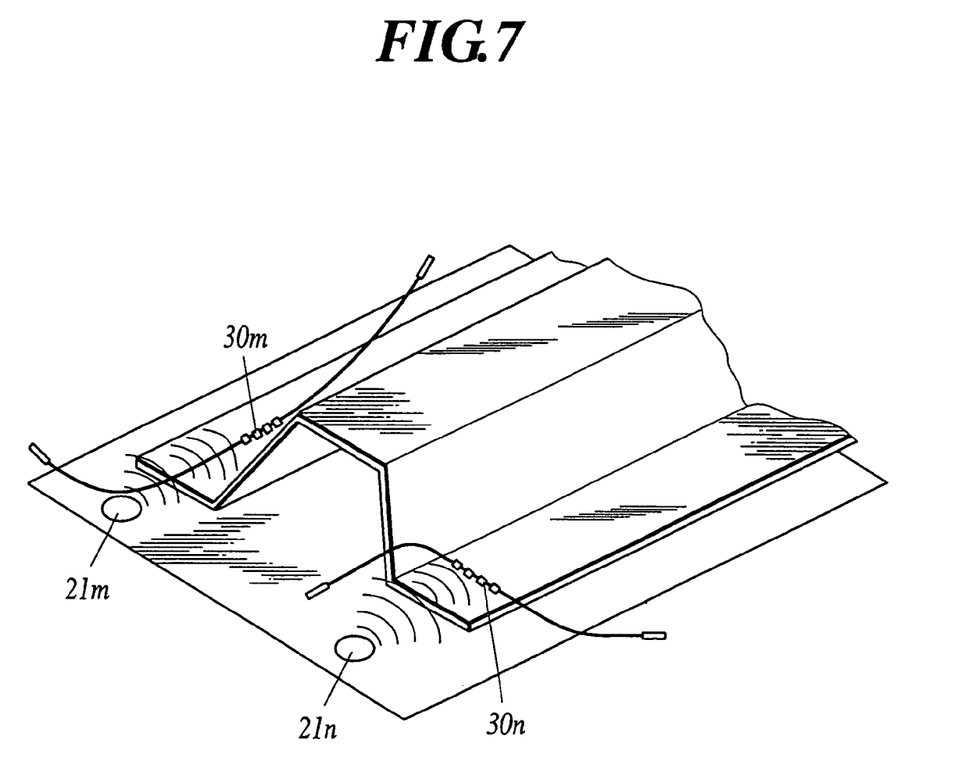
FIG. 7 is a perspective view of a skin/stringer structure in which optical fiber sensors and piezoelectric elements are embedded.

As in an arrangement of a optical fiber sensor 30m and a piezoelectric element 21m, which is shown in FIG. 7, it is preferable for the optical fiber sensor and a vibration applying source, such as the piezoelectric element, to be arranged such that a propagation direction of the elastic wave at a position of the optical fiber sensor coincides with an optical axis of the optical fiber sensor. This arrangement allows the optical fiber sensor to detect the propagated elastic wave with high sensitivity.

In a combination of a optical fiber sensor 30n and a piezoelectric element 21n, as shown in the same drawing, the optical axis of the optical fiber sensor crosses the propagation direction of the elastic wave with 90 degrees at a position of the optical fiber sensor. This arrangement makes the sensitivity worst, and therefore use of such a combination should be avoided.

A directivity test of a optical fiber sensor will be disclosed below.

Figure 8:
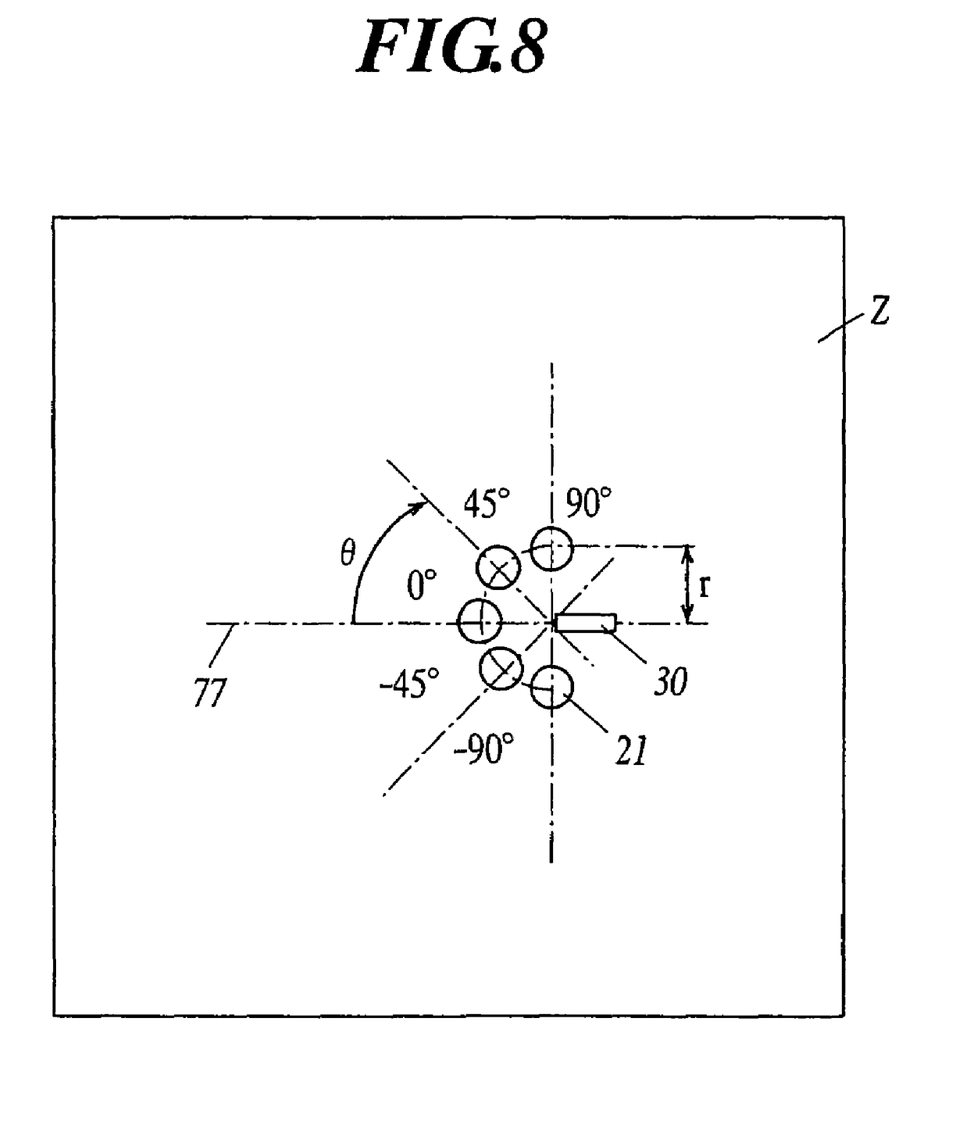
FIG. 8 is a plan view of a sample for directivity test of a optical fiber sensor.
Figure 9A:
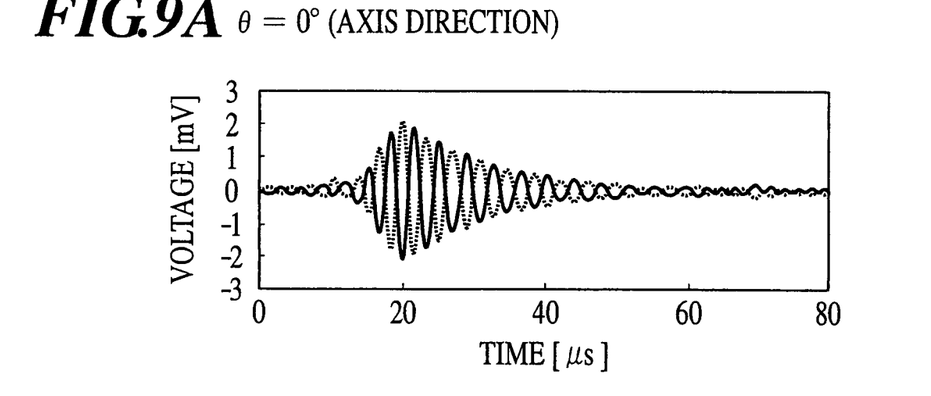
FIGS. 9A-9C show a series of waveforms of output waves of the spectrum analyzer, obtained in the directivity test of the optical fiber sensor.
Figure 9B:
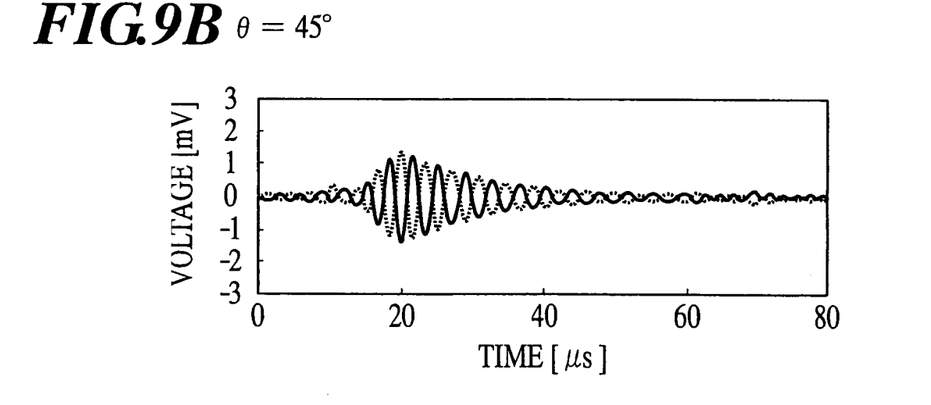
Figure 9C:
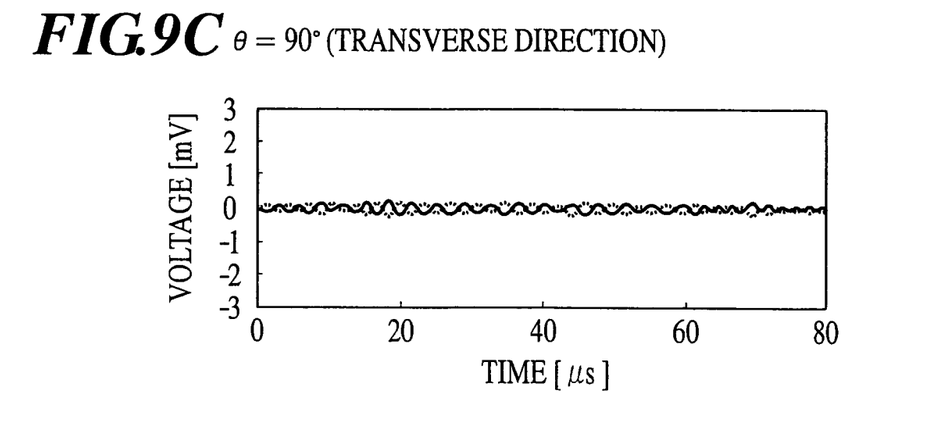
Figure 10:
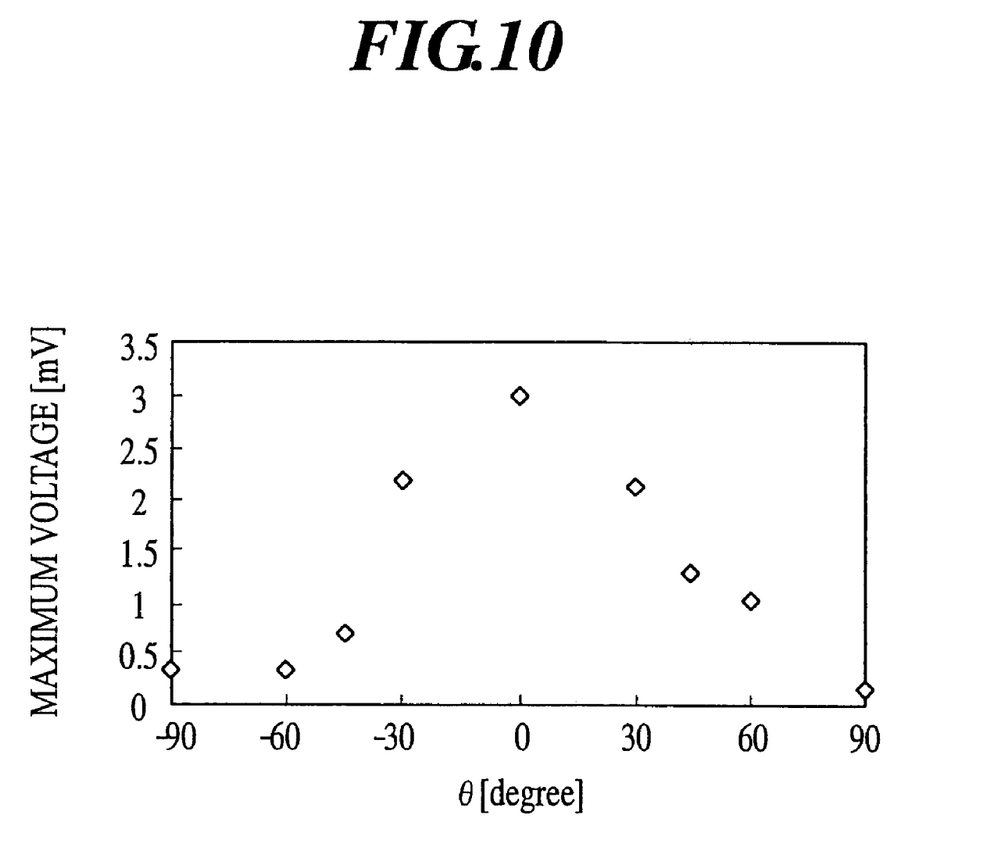
FIG. 10 is a graph showing the relationship between θ shown in FIG. 8 and the maximum voltage of the output waves of the spectrum analyzer.

As shown in FIG. 8, the piezoelectric element 21 was disposed at various positions relative to an optical axis 77 of the optical fiber sensor 30, and output waves from the spectrum analyzer 42 were obtained when the piezoelectric element 21 generated vibration. The waves obtained when θ equals 0°, 45° and 90° degrees are shown in FIGS. 9A, 9B and 9C, respectively. Maximum values of output waves obtained at θ=0°, ±30°, ±45°, ±60° and ±90° are shown in a graph of FIG. 10.

When θ equals 0 degree, that is, when the propagation direction of the elastic wave at a position of the optical fiber sensor 30 coincides with the optical axis of the optical fiber sensor 30, an output wave having a maximum value of 3 mV, which is comparatively large value, was obtained. The output wave had a peak value at θ=0°, a value not so much reduced at θ=±30°, and a value sharply reduced at θ=±45°. When θ equals ±90°, that is, when the optical axis of the optical fiber sensor 30 is at right angles to the propagation direction of the elastic wave, the maximum values were 0.1-0.3 mV, which were largely reduced relative to the peak value at θ=0°.

In a simple structure as shown in FIG. 8, when the piezoelectric element 21 is disposed as a vibration source on an extension to the optical axis 77 of the optical fiber sensor 30, the angle between the propagation direction of the elastic wave at a position of the optical fiber sensor and the optical axis of the optical fiber sensor can be set to approximately zero degree.

However, the propagation of an elastic wave becomes complicated in practical structures, and therefore a most suitable arrangement may be preferably implemented as in the following procedure (1) to (3).

(1) First, a model for a portion and shape of damage to be detected should be established.

(2) Next, using general-purpose software PZFLEX, a piezoelectric element may be placed on an arbitrary position of the structure. Further, when the piezoelectric element sends an elastic wave, propagation directions and pressure distribution of the wave may be obtained with numerical analysis.

(3) Based on the result of above (2), a optical fiber sensor should be disposed at the position where highest pressure appears and in parallel with a direction to which the elastic wave travels.

(Method for Determining Sensor Length of Optical Fiber Sensor)

In order to obtain an elastic wave, most suitable sensor length is required to be set in addition to the most suitable sensor position. Detection sensitivity of a optical fiber sensor for an elastic wave varies depending on the relation between the wavelength of the elastic wave and the sensor length of the optical fiber sensor 30 (or the length of the grating portion).

For this reason, spectrum of the reflected light from the optical fiber sensor 30 receiving the elastic wave was theoretically simulated, and the suitable sensor length of the sensor 30 for detecting the elastic wave was analytically sought.

Figure 11A:
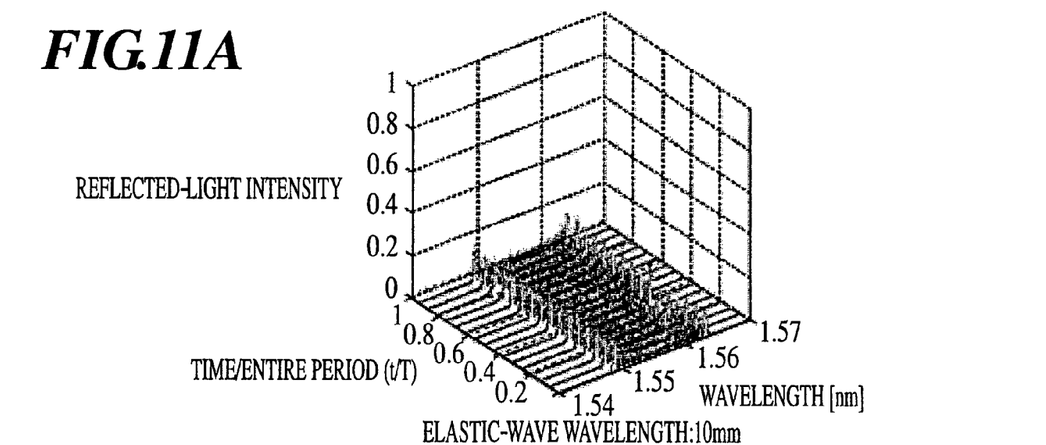
FIGS. 11A-11C are a series of 3D diagrams showing analyzed results for spectrum response of reflected light in the case that sensor length is 10 mm.
Figure 11B:
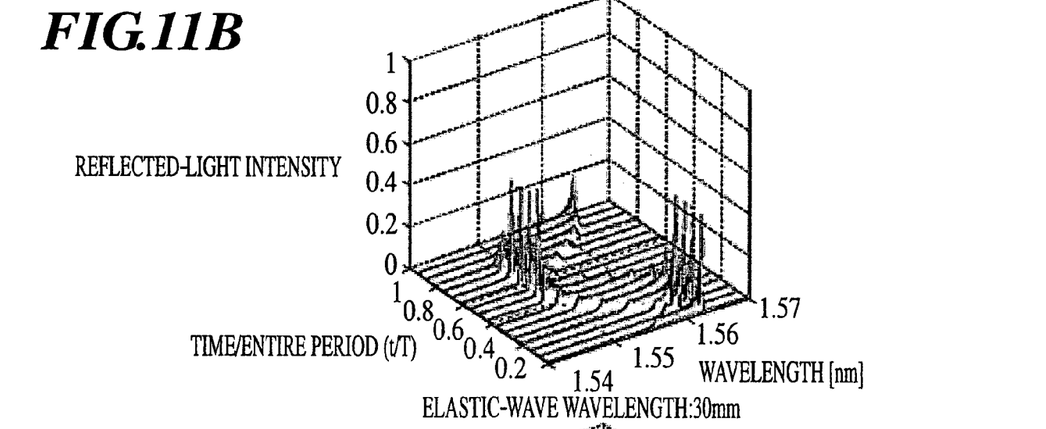
Figure 11C:
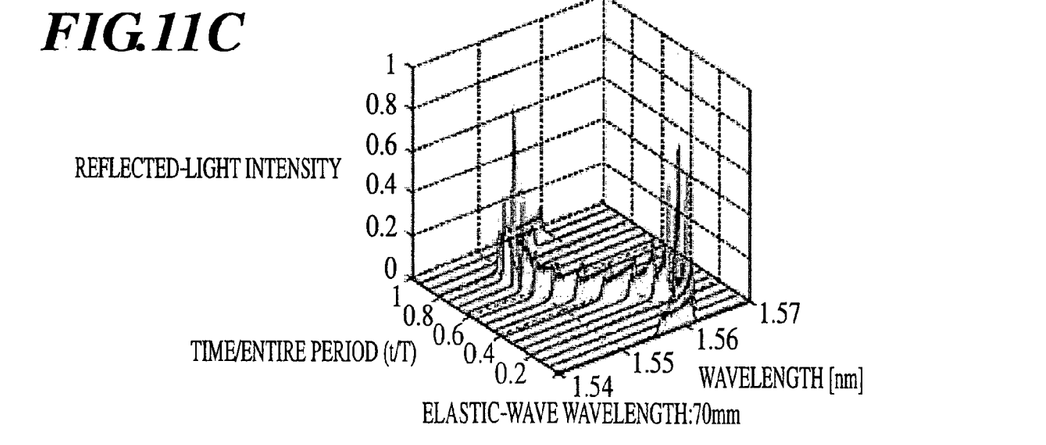

When the sensor length is 10 mm, for example, the spectrum of the reflected light from the optical fiber sensor 30 receiving the elastic wave was theoretically simulated, and the result as shown in FIG. 11 was obtained. FIG. 11A shows an analyzed result when wavelength of the acoustic was set to 10 mm, FIG. 11B to 30 mm, and FIG. 11C to 70 mm. From this analyzed result, when the wavelength of the elastic wave is set to 30 mm or more, the peaks in response frequencies appear for respective times. Accordingly, it is confirmed that the wavelength of an elastic wave has to secure about three times the sensor length. That is, it was found that an elastic wave can be detected with high accuracy when the sensor length is about one-thirds of the wavelength of the elastic wave.

Figure 12A:
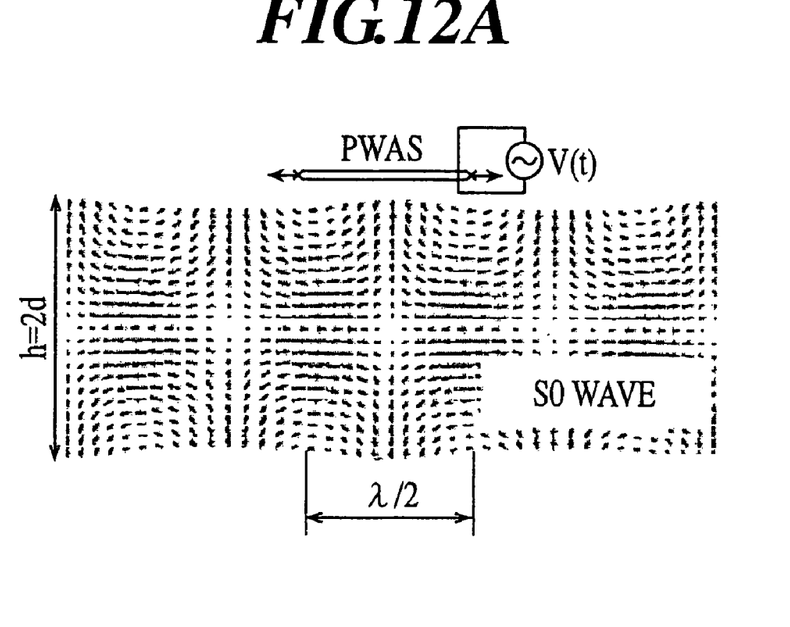
FIG. 12A is a plan view of $S_0$ wave propagating through a structure.
Figure 12B:
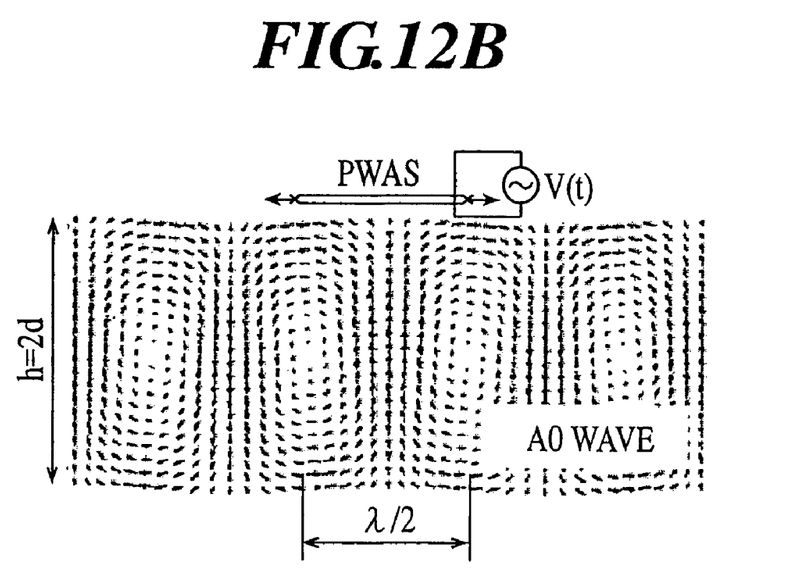
FIG. 12B is a plan view of $A_0$ wave.
Figure 13:
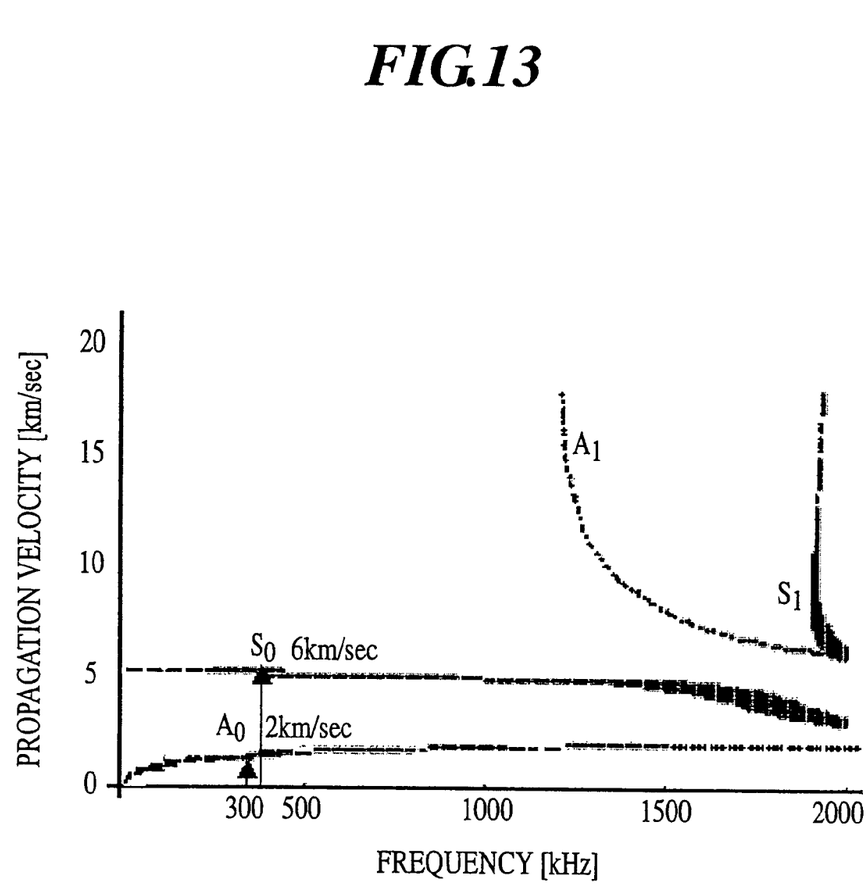
FIG. 13 is a graph showing the relationship between frequency and propagation velocity of an elastic wave propagating in a cross-wise laminated CFRP board ($[0_2/90_2]s$, thickness of 1 mm).

On the other hand, referring to FIG. 13, when a frequency f of an elastic wave emitted into a composite material is 300 kHz, propagation velocity of the elastic wave is 6 km/sec for $S_0$ wave (one mode of wave propagating in the structure, symmetrical wave, see FIG. 12A), and 2 km/sec for $A_0$ wave (one mode of wave propagating in the structure, asymmetrical wave, see FIG. 12B). Since wavelength λ of the elastic wave is given by λ=v/f, $S_0$ wave is calculated to be 20 mm, and $A_0$ wave be 6 mm. When the sensor length is designated to be one-thirds of these waves taking the previous result into account, the sensor length for detecting $S_0$ wave needs to be 7 mm or less, and for the $A_0$ wave 2 mm or less.

In order to detect both $S_0$ wave and $A_0$ wave with good sensitivity, a suitable sensor length is to be set to 2 mm or less. However, shorter length of the sensor makes broader the spectrum shape of the reflected light from the sensor, which tends to causes the sensor sensitivity lower, therefore the sensor length is preferably selected to be 1-2 mm.

What is claimed is:

1. A damage detection system comprising:
   a vibration actuator to apply vibration to a subject to be inspected;
   an optical fiber sensor including a core portion to have a grating portion formed therein, the grating portion having a plurality of gratings reflecting light, wherein a wavelength band of the reflected light changes when a distance between adjacent gratings changes, and the optical fiber sensor vibrates the wavelength band depending on an elastic wave transmitted from the subject;
   a light source to input broadband light which includes at least a vibration range of the wavelength band, into the core portion;
   two optical filters connected to an output end of the optical fiber sensor; and
   an arithmetic processing apparatus to perform arithmetic processing on output values of the two optical filters, the values being obtained when the vibration actuator applies vibration,
   wherein each of passbands of the two optical filters overlaps with the vibration range of the wavelength band, in which a center wavelength of one of the passbands is fixed to an upper area with respect to a vibration center of a center wavelength of the reflected light and a center wavelength of the other of the passbands is fixed to a lower area with respect to the vibration center of the center wavelength of the reflected light, and said center wavelengths are positioned apart from the vibration center not less than an amplitude of wavelength vibration of the reflected light.

2. The damage detection system according to claim 1, wherein the optical filters are arrayed waveguide grating type optical filters.

3. The damage detection system according to claim 2, wherein the grating portion of the optical fiber sensor has a length not more than one-thirds of a wavelength of the elastic wave transmitted from the subject.

4. The damage detection system according to claim 2, wherein the arithmetic processing apparatus analyzes a change of output values for a predetermined period output from the two optical filters and calculates a value corresponding to a scale of damage in the subject.

5. The damage detection system according to claim 1, wherein the grating portion of the optical fiber sensor has a length not more than one-thirds of a wavelength of the elastic wave transmitted from the subject.

6. The damage detection system according to claim 5, wherein the arithmetic processing apparatus analyzes a change of output values for a predetermined period output from the two optical filters and calculates a value corresponding to a scale of damage in the subject.

7. The damage detection system according to claim 1, wherein the arithmetic processing apparatus analyzes a change of output values for a predetermined period output from the two optical filters and calculates a value corresponding to a scale of damage in the subject.

8. A damage detection system comprising:
an optical fiber sensor including a core portion to have a grating portion formed therein, the grating portion having a plurality of gratings reflecting light, wherein a wavelength band of the reflected light changes when a distance between adjacent gratings changes;
a light source to input broadband light which includes the wavelength band, into the core portion;
two optical filters connected to an output end of the optical fiber sensor and the two optical filters having passbands which the reflected light passes through; and
an arithmetic processing apparatus to perform arithmetic processing on output values of the two optical filters,
wherein a central wavelength of one of the passbands is positioned not greater than a minimum central wavelength of the reflected light and a central wavelength of the other of the passbands is positioned not smaller than a maximum central wavelength of the reflected light.

9. The damage detection system according to claim 8, further comprising:
a vibration actuator to apply vibration to a subject to be inspected.

10. The damage detection system according to claim 9, wherein the grating portion of the optical fiber sensor has a length not more than one-thirds of a wavelength of an elastic wave transmitted from the subject.

11. The damage detection system according to claim 8, wherein the optical filters are arrayed waveguide grating type optical filters.

12. The damage detection system according to claim 8, wherein the arithmetic processing apparatus analyzes a change of output values for a predetermined period output from the two optical filters and calculates a value corresponding to a scale of damage in a subject to be inspected.

* * * * *